United States Patent
Cialone et al.

(10) Patent No.: US 7,445,170 B2
(45) Date of Patent: Nov. 4, 2008

(54) PROCESS AND APPARATUS FOR MANUFACTURING CRUMB AND POWDER RUBBER

(75) Inventors: Anthony M. Cialone, Garden City, NY (US); Peter J. Waznys, Centerport, NY (US); George W. Meckert, New York, NY (US)

(73) Assignee: Lehigh Technologies LLC, Garden City, NY (US)

( * ) Notice: Subject to any disclaimer, the term of this patent is extended or adjusted under 35 U.S.C. 154(b) by 686 days.

(21) Appl. No.: 10/714,782

(22) Filed: Nov. 17, 2003

(65) Prior Publication Data

US 2005/0107484 A1  May 19, 2005

(51) Int. Cl.
B02C 19/00 (2006.01)
(52) U.S. Cl. .............. 241/24.17; 241/24.19; 241/65; 241/81; 241/DIG. 31; 241/DIG. 37
(58) Field of Classification Search .......... 241/DIG. 31, 241/DIG. 37, 23, 65, 79, 24.12, 80, 24.13, 241/24.14, 24.15, 24.17, 24.19, 24.27, 342.12, 241/DIG. 32, 81; 521/45.5
See application file for complete search history.

(56) References Cited

U.S. PATENT DOCUMENTS

| | | | | | |
|---|---|---|---|---|---|
| 4,025,990 | A | * | 5/1977 | Lovette, Jr, | 241/14 |
| 5,385,307 | A | * | 1/1995 | Azar | 241/41 |
| 5,524,838 | A | * | 6/1996 | Ellers et al. | 241/23 |
| 5,588,600 | A | * | 12/1996 | Perfido et al. | 241/23 |
| 5,735,471 | A | * | 4/1998 | Muro | 241/23 |
| 5,927,620 | A | * | 7/1999 | Memon | 241/17 |
| 2004/0094641 | A1 | * | 5/2004 | Chen | 241/19 |

* cited by examiner

Primary Examiner—Mark Rosenbaum
(74) Attorney, Agent, or Firm—Scully, Scott, Murphy & Presser, P.C.

(57) ABSTRACT

A process and apparatus for manufacturing crumb and powder rubber. The process and apparatus include a cooling step, effectuated by cooling means, wherein the temperature of cryogenically cooled preprocessed rubber particles is controlled. The process and apparatus also include a grinding step, effectuated by grinding means, in which the degree of grinding, and thus the product particle size range, is controlled.

39 Claims, 2 Drawing Sheets

PROCESS AND APPARATUS FOR MANUFACTURING CRUMB AND POWDER RUBBER

BACKGROUND OF THE DISCLOSURE

1. Field of the Invention

The present invention is directed to a process and apparatus for making crumb and powder rubber from recycled rubber sources. More specifically, the present invention is directed to a process and apparatus for making crumb and powder rubber from a preprocessed source of used rubber particles having a predetermined particle size range.

2. Background of the Prior Art

It is long been known that the disposal of used tires and other rubber articles represents a major environmental problem insofar as used tires overwhelm waste disposal sites and indiscriminate discarding of tires and like rubber articles create major environmental problems. It is for this reason that processes have been developed to dispose of tires in a manner that not only eliminates them as an environmental problem but provides incentives for practice of those tire disposal processes.

These processes originally focused upon tire comminution which recovered the inherent fuel value of the significant combustible content of the vehicle tires. More recently, processes which recover the rubber constituent of vehicle tires, for reuse in the manufacture of rubber-containing articles, have been developed.

Although these processes encouraged environmental protection by providing processes for the utility of rubber in the further manufacturing of new rubber products, a major concern associated with these processes has been the inability to provide purchasers of the rubber products produced in these processes with a rubber material that can be readily incorporated into the purchaser's production feed. That is, randomness of comminution variables and the types and condition of the used vehicle tire feed have produced random rubber products. Probably the most undesirable result of this random production has been the unpredictable rubber product particle size distribution. That is, although a lively market exists for crumb and powder rubber this market has not yet been fully exploited due to the inability to produce crumb and powder rubber in the particle size ranges required by tire and other rubber product producers who are the target purchasers of crumb and powder rubber products.

U.S. Pat. No. 5,588,600 describes a process and apparatus for low temperature comminution of tires in which cryogenic fluids, employed in embrittling the tires so that comminution can effectively occur, is recycled. This process produces crumb rubber of a sufficiently small particle size desirable to tire and other rubber product manufacturers. However, even the process of the '600 patent provides no assurance that the product rubber particle size range is desired by the customer, the manufacturer of new tires and other rubber product goods.

Other disclosures of process and apparatus for reducing rubber to fine particle size include U.S. Pat. Nos. 5,368,240 and 4,863,106. Although both of these disclosures describe processes for producing fine-sized rubber utilizing cryogenic fluids, neither of these references disclose means for custom designing the particle size range of the product to enhance commercial viability of such processing.

The above remarks establish the need in the art for a new apparatus and process which not only consumes used rubber goods, particularly tires, from the environment but, in addition, produces a crumb and powder rubber product that is highly marketable insofar as it is provided in predetermined particle size ranges and in increased quantities desired by manufactures of tires and other rubber products.

BRIEF SUMMARY OF THE INVENTION

A process and an apparatus has now been developed which provides crumb and powder rubber in a predictable and predeterminable particle size range in concentrations that permit tire and other rubber producers to utilize such crumb and powder rubber in commercial production of tires and other rubber products. This process additionally provides substantially no foreign matter such as fiber, metals and the like which are present in used tires and other used rubber products.

In accordance with the present invention a process for producing crumb and powder rubber from used rubber products is provided. In this process rubber particles of predetermined particle size range are chilled by a cryogenic fluid under conditions permitting tight control of the output temperature of the particles. The chilled particles are thereupon ground under conditions permitting close control of the reduced particle size range of the ground product. The reduced ground rubber particles are screened into desired crumb and powder rubber particle size ranges.

In further accordance with the present invention an apparatus for producing crumb and powder rubber having a predetermined particle size range is provided. The apparatus includes chilling means for chilling a preprocessed stream of used rubber particles of predetermined particle size range ground from tires and other rubber products. The apparatus includes grinding means or comminuting the chilled rubber particles to a predetermined particle size range. The apparatus also is provided with screening means for separating the ground rubber particles.

BRIEF DESCRIPTION OF THE DRAWINGS

The present invention will be better understood with reference to the accompanying drawings of which.

DETAILED DESCRIPTION

Figure 1:
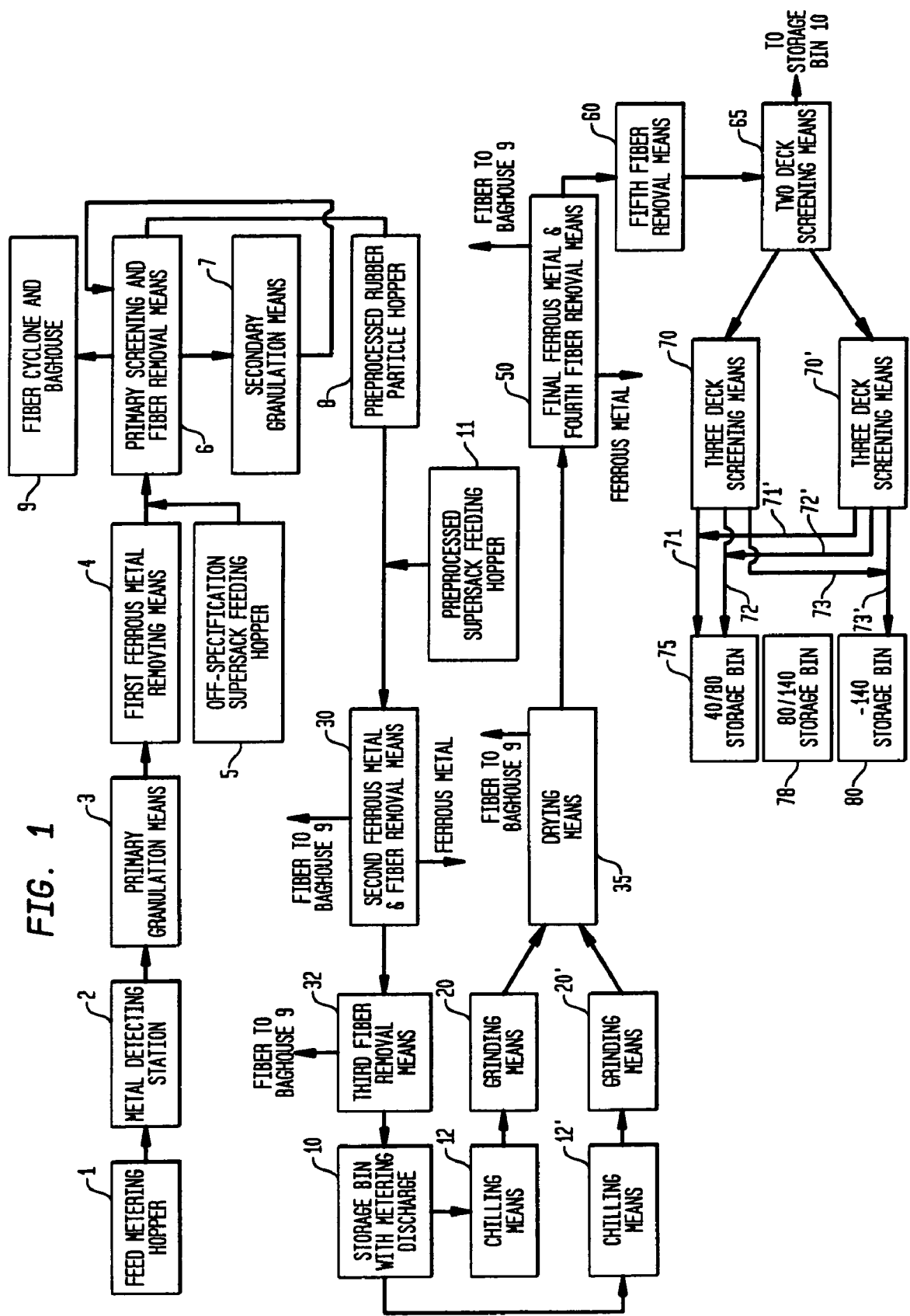
FIG. 1 is a schematic flow diagram of the process and apparatus of the present invention.
Figure 2:
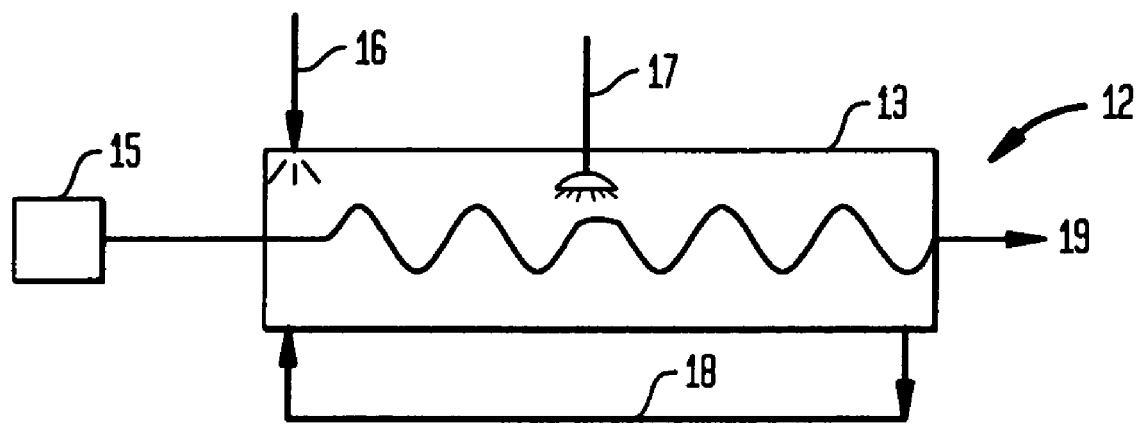
FIG. 2 is a schematic representation of the freezing chamber which provides controlled freezing of rubber particles.
Figure 3:
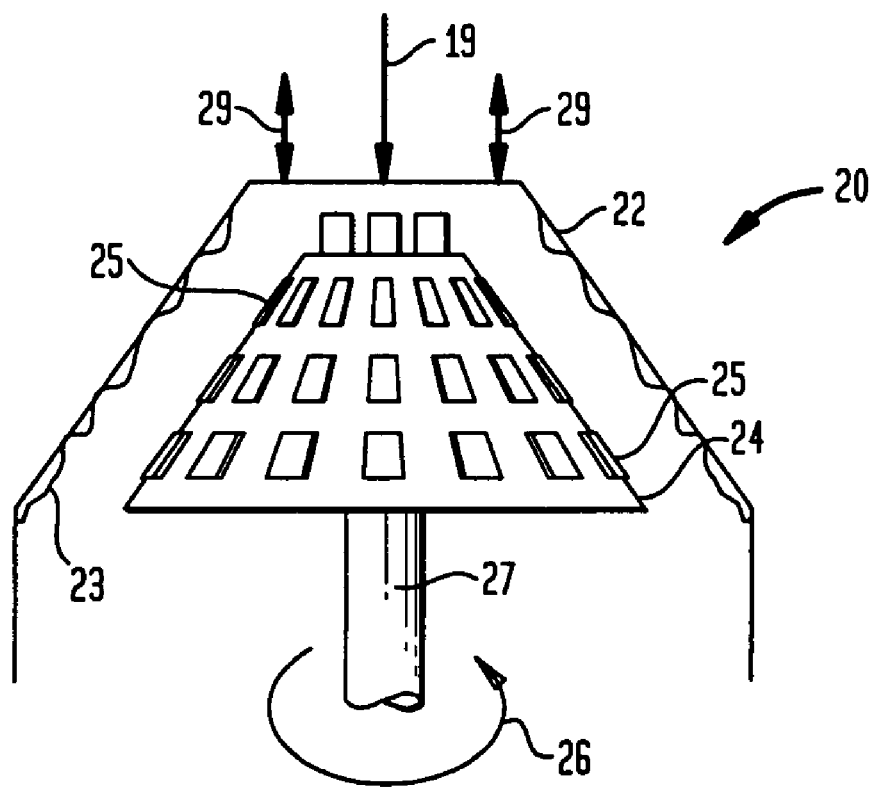
FIG. 3 is a schematic elevational view of a grinding apparatus providing controlled particle size product.

The process and apparatus of the present invention is initiated by the introduction of used rubber, particularly used tire. In one preferred embodiment rubber feedstock derived from commercial operators who randomly comminute used vehicle tires and other used rubber products is utilized. Such material is introduced into the process and apparatus of the present invention by being charged into a feed metering hopper 1. This rubber is usually received in supersack quantities.

In a preferred embodiment, the feed rubber particles are passed over a metal detector, preferably an electromagnetic field adjusted in strength to detect large ferrous metal particles, denoted as tramp metal. Tramp metal is distinguished from small ferrous particles resulting from the comminution of used steel belt-containing tires. This is illustrated in the drawings by metal detecting station 2. The metal detector station 2 is preferably an electromagnetic field adjusted to identify large metal objects. The strength of the electromagnetic field is adjusted so that small ferrous metal slivers are not identified and thus not removed. It is emphasized that tramp metal detection is employed to protect equipment from large metal objects that would damage equipment employed in the process and apparatus of the present invention if not removed prior to introduction into the apparatus. The removal of tramp metal is a manual operation wherein the large metal object or objects identified are physically removed from the feed material.

The feed material, free of tramp metal, is then conveyed to a primary granulating means 3. Primary granulating means 3 effectuates granulation of the course particles by means of rotating and stationary blades between which the rubber particles are granulated. As a general rule the primary granulation means reduces the particles to a range roughly between about 0.1875 inch and particles passing through U.S. sieve size No. 30. It is emphasized that this granulation operation occurs under ambient thermodynamic conditions.

The granulated particles exiting granulating means 3 is conveyed to a first ferrous metal removing means 4 wherein ferrous metal slivers, usually liberated due to the granulation of rubber particles derived from steel belted tires, are drawn off the granulated product stream by a magnetic belt preferably disposed in a perpendicular direction to the conveyor carrying the granulation product. Those skilled in the art appreciate that such an arrangement is denoted as a cross belt magnet.

In an alternate embodiment the aforementioned processing steps are omitted in favor of the receipt from vendors of off-specification rubber particles that have been granulated to approximately the same particle size range as that obtained in granulating means 3 and which has been subjected to a ferrous metal removal procedure similar to that occurring in first ferrous metal removing means 4. This is depicted in the drawings by off-specification supersack feeding hopper 5. Indeed, the present process and apparatus contemplates an embodiment where a combination of feed from hopper 5 and first ferrous metal removal means 4 is employed.

This feed from removal means 4, hopper 5 or both is conveyed to a primary screening and fiber removal means 6. The primary screening and fiber removal means 6 includes a screen to remove oversized particles. In a preferred embodiment a primary screener removes particles having a size in excess of about 0.1875 inch.

This screening device relies on vibrations to aid in separating oversized from in-specification size particles. The disturbances caused by these vibrations enable this processing step to include fiber removal. The granulation step produces a large concentration of fiber threads and fiber fuzz, hereinafter referred to as "fiber" especially when the rubber particles are derived from vehicle tires. The particles, disposed over a broad surface area, move from the upstream end of the screener to the downstream end. The disturbances caused by this vibration form a "fluidized bed" effect in which, due to density, the lighter fiber separates from the heaver rubber granules. At a predetermined distance toward the downstream end, the solid stream comprising rubber granules and fiber encounters a barrier wedge over which the stream must rise to pass. This barrier further agitates the solid particle stream and further separates the lighter fiber from the heavier rubber particles. The primary screener fiber removal apparatus 6 includes a narrow adjustable width exhaust hood disposed upstream of the barrier wedge. The length of the exhaust hood is the same as the width of the fiber separator. This exhaust hood aspirates the lighter fiber from the top of the feedstock. The exhaust hood, whose height above the fluidized bed and aspiration is adjustable, controls fiber entrapment velocity.

The primary screener and fiber removal means 6 includes a second barrier wedge. Although most of the fiber is removed when the particle stream encounters the first barrier wedge, additional fiber aspiration occurs at the second barrier wedge. The extracted fiber, removed by aspiration in the primary screener and fiber removal apparatus 6, is delivered to a unit cyclone and baghouse 9. The unit cyclone and baghouse 9 permits optimum fiber entrapment velocity and minimum product loss.

Particles that pass through the screen of the primary screening and fiber removal means 6 are conveyed to a preprocessed rubber particle hopper 8. Particles that do not pass through the screen of the primary screening and fiber removal means 6 are conveyed to secondary granulation means 7. Secondary granulation means 7, in a preferred embodiment, is an apparatus substantially identical to the apparatus constituting the primary granulation means 3. Similarly, the processing of rubber particles in the secondary granulation means 7 emulates the processing conducted in the primary granulation means 3. Thus, granulation relies upon granulation of the particles between stationary and rotating blades conducted at atmospheric pressure and ambient temperature. The product exiting the secondary granulation means 7 is recycled back into the primary screening and fiber removal means 9 and the aforementioned procedure is repeated.

In yet another preferred embodiment of the present invention rubber particle product equivalent to the rubber particle product present in the preprocessed rubber particle hopper 8 is utilized. This equivalent product, provided by vendors meeting specification requirements dictated by the operator of the process and apparatus of the present invention, is shipped in supersacks and is loaded into preprocessed supersack feeding hopper 11, which is substantially identical to hopper 8.

The product conveyed from hopper 8, hopper 11 or both is conveyed to a second ferrous metal and fiber removal means 30. The second ferrous metal and fiber removal means 30, in a preferred embodiment, is provided by disposing the rubber particle stream on a mesh surface that is agitated to separate the particles. A magnetic drum, preferably a rare earth magnetic drum, providing strong ferrous metal attraction, draws off ferrous metal particles. At the same time, agitation creates elevation of the non-metal particles above the mesh conveyer surface wherein the lower density fiber particles separate above the higher density rubber particles so that the higher elevation lower density fiber particles are easily separated and removed from the lower elevation higher density rubber particles by aspiration. The aspirated fiber is conveyed to fiber cyclone and baghouse 9.

The focus upon fiber removal of the rubber particle product is emphasized by the subsequent processing step that occurs at a third fiber removal means 32. Third fiber removal means 32 preferably employs a centrifugal separator. The particles, subsequent to ferrous metal and fiber removal in second fiber removal means 30, are introduced into a cylindrical shaped screen container provided with an impeller. When the impeller is rotated the centrifugal force causes the desirable fine particles to pass through the screen and discharge at the bottom of the apparatus. Oversized particles and fiber, which balls up, cannot pass through the screen and are discharged through a separate conduit.

The thus processed rubber particles stream is conveyed to storage bin 10 provided with metering discharge to provide controlled flow therefrom. The metered rubber particle stream from storage bin 10 is fed into at least one chilling means 12. In a preferred embodiment, illustrated in the drawings, two parallel identical chilling means 12 and 12' are employed providing increased productivity.

The chilling means 12 is characterized by being able to closely control the temperature of the rubber particles that are processed therein. This control is the result of control of the chillant, preferably a cryogenic fluid. The preferred cryogenic fluid is liquid nitrogen. This is not to say that liquid inert gases, such as liquefied argon, neon or helium, cannot be used. However, liquid nitrogen, having a very low temperature at atmospheric pressure and readily available at relatively low cost, enjoys a tremendous cost advantage over liquefied inert gases. However, in the event that special circumstances warrant, liquefied inert gases may be employed.

The cryogenic fluid, usually liquid nitrogen, is fed into a cylindrical shaped vessel 13, by means of a spray nozzle, ports, a manifold or the like, at a controlled volumetric rate. The liquid nitrogen is introduced into cylindrical shaped vessel 13 at approximately the midpoint between the inlet and outlet ends. As those skilled in the heat transfer arts are aware, cooling efficiency is maximized by recycling cold vaporized nitrogen gas, which results from the heating of the nitrogen liquid during the chilling of the rubber particles, into the inlet end of vessel 13 concurrently with the metered introduction of the rubber particle stream from storage bin 10. This pre-cooling makes more efficient the final chilling of the rubber particles stream primarily effectuated by the nitrogen liquid.

The rubber particle stream from storage bin 10 is conveyed to a rotating auger 14, as illustrated by rubber particle stream 16, whose speed, and thus the duration of time the rubber particles remain in the chilling means 12, is controlled by variable speed rotor 15 controlling auger velocity. Thus, the combination of controlling rubber particle feed rate, the speed of the rotor turning the auger and the volumetric feed rate of the cryogenic fluid permit control of the temperature of the chilled rubber particles exiting chilling means 12. As shown in the drawings, the cold vapored nitrogen gas 18 is recycled back into the inlet of cylindrical shaped vessel 13 so as to flow concurrently with rubber particle stream 16.

The chilling means 12 is in communication with a grinding means 20 disposed downstream of the downstream end of the cylindrical shaped vessel 13. Chilling means 12 and grinding means 20 are coordinated so that the precise desired amount of chilled rubber particles 19 leaving cylindrical shaped vessel 13 is introduced into the grinding means 20.

Grinding means 20 provides precise control of the particle size distribution of the rubber comminuted therein. Grinding means 20 includes an outer inverted cone 22. The inside surface 23 of the outer inverted cone 22 is serrated and acts as any rebound surface does in a typical impact mill. The component corresponding to an impact surface in a typical impact mill is an inverted conical-shape surface 24 provided with a multiplicity of knife edges 25. The impact surface 24 is rotatable by a rotor 27 and rotates as indicated by arrow 26. Control of the rubber particle size distribution results from the adjustability of the outer inverted cone 22. The outer inverted cone 22 can be raised and lowered as depicted by arrows 29. The raising of the outer invented cone 22 increases the space between the rotating knives 25, and the serrated surface 23 of the outer inverted cone 22. Thus, depending on the desired particle size range product, the outer inverted cone 22 is moved down to obtain finer sized rubber particles. Obviously, the moving up of outer inverted cone 22 results in larger sized rubber particles.

In operation, discharged frozen rubber particles 19 from the chilling means 12 enter the top of grinding means 20 and fall between knives 25 of impact surface 24 and serrated surface 23 of outer inverted cone 22. The impact surface rotor 27 rotates the impact surface 24 at the desired rotational speed to grind the rubber particles between knives 25 and serrated edge 23.

In a preferred embodiment discussed above and illustrated in the drawings, grinding means 20 is conically shaped. The material of construction of grinding means 20 is designed to operate under cryogenic temperature conditions. In a preferred embodiment, the outer jacket is a cast metal alloy that can withstand cyrogenic operating temperatures. The outer inverted cone 22 is hydraulically removable for cleaning, normal maintenance and emergency repair. In a preferred embodiment the impact surface 24 rotates at a speed of approximately 1800 RPM. The knives 25, disposed on conical surface 24, are preferably "C" shaped and are complementary with the serrations on the inner surface 23 of the outer inverted cone 22. The knives 25 are removable for sharpening and replacement.

The operation of grinding means 20 starts with the introduction of a feedstock, e.g. chilled rubber particles, that is fed through the top of grinding means 20 and which immediately impacts a series of horizontal knives 25 atop impact surface 24. Particle size reduction of the rubber particles continue as the rubber particle stream flows downward in grinding means 20 insofar as the number of the knives 25 on the surface 24 in a horizontal row increases in number in the downward direction at higher peripheral speeds. The rubber particle stream is ultimately discharged at the bottom of grinding means 20.

As stated above, in a preferred embodiment, in order to increase production, the process and apparatus of the present invention may include parallel identical chilling means. In that preferred embodiment, depicted in the drawings, parallel grinding means 20', identical to parallel means 20, is provided. In this preferred embodiment, the rubber particles product of chilling means 12' are fed into grinding means 20', just as are the rubber particles product 19 of chilling means 12 conveyed into grinding means 20. Whether one or two chilling means and grinding means is utilized, the rubber particle product of grinding means 20 or 20 and 20' are conveyed to a drying means 35.

Drying means 35 is primarily provided to raise the temperature of the rubber particle product of the grinding operation in grinding means 20 to ambient. In a preferred embodiment, drying means 35 is provided by a rotary dryer provided with gas entraining means, preferably air, to "wash" the dried rubber particle product. This "wash" has the effect of agitating rubber particles and fiber, thus separating lighter density fiber from the rubber particle product by aspiration of the fiber. Again, this fiber is conveyed to fiber cyclone and baghouse 9.

A final ferrous metal and fourth fiber removing means 50 for removing ferrous metal and fiber, downstream of drying means 35, is provided. Ferrous metal removal means 50, which receives the dried rubber particle product of drying means 35, is disposed immediately downstream of drying means 35. In a preferred embodiment, ferrous metal removal means 50 is in the form of a rare earth drum magnet.

In this processing step the dried rubber particles are preferably separated from ferrous metal particles while on a vibratory screen whereat metal particles are drawn to the drum magnet and removed. At the same time, the vibrating action of the screen results in density separation of lighter density fiber from higher density particles. This separated fiber is removed to the fiber cyclone and baghouse 9.

Yet another fiber separation occurs immediately downstream of the above fiber removal step. This processing step is provided by fifth fiber removal means 60. Fiber removal means 60, in a preferred embodiment, involves conveyance of the ferrous metal-free rubber particles to a centrifugal separator wherein fiber, present in the rubber particle stream, is removed and transferred to the fiber cyclone and baghouse 9. The centrifugal separator is of the same design and operates in like fashion to the centrifugal separator of the third fiber removal means 32.

The above description emphasizes the many times that the process and apparatus of the present invention of making crumb and powder rubber includes fiber removal from the rubber particle product stream. Those skilled in the art appreciate that the present invention assigns criticality to fiber removal in the successful manufacture of rubber products, especially tires. Thus, consistent with this philosophy, the final steps in the process and apparatus of the present invention, which are screening processing steps, also involve fiber removal.

The first final screening operation is to transfer the rubber particles product exiting fiber separation means 60 to a two-deck screening means 65. Two-deck screening means 65 includes a screener to eliminate particles whose size is too large to meet the requirement of the crumb and/or powder rubber purchaser. Typically, particles that do not pass through a U.S. sieve size No. 40 screen are too large to be effective as crumb rubber. Thus, in a preferred embodiment, the screener is a U.S. sieve size No. 40. Particles that do not pass through this screen are recycled back into storage bin 10 for reprocessing.

Rubber particles passing through the U.S. sieve size No. 40 screen are transferred to a final three-deck screening means 70. Indeed, in a preferred embodiment, two such screening means are provided. This is illustrated in the drawings by a second three-deck screening means 70'.

The three-deck screening means 70 permits separation of particle sizes within the accepted size limits that define crumb and powder rubber. This is accomplished by disposing a courser screener atop a finer screener thus resulting in three different particle sized products, which are the products of the process and apparatus of the present invention.

In a preferred embodiment, the top deck product, constituting rubber particles that do not pass through the top, courser screener is rubber particles of particle size smaller than U.S. sieve size No. 40 but larger than U.S. sieve size No. 80, which is the preferred courser size screen employed in the three-deck screening means 70. This product is conveyed, by means of conduit 71 and, if present, 71', to storage bin 75. This conveyance to storage bin 75 is accomplished by pneumatic means as are the conveyance of the other two products discussed below.

The second, intermediate cut of rubber particles produced in three-deck screening means 70 encompasses particles passing through the courser screener but too large to pass through the finer screener. In a preferred embodiment the finer screener is provided by a screen of U.S. sieve size No. 140. Thus, the particles held by the finer screener are conveyed to storage bin 78 through conduit means 72 and, if present, 72'. Storage bin 78 holds rubber particles having a particle size range of particles that pass through U.S. sieve size No. 80 but do not pass through U.S. sieve size No. 140.

The third rubber particle size product, representative of powder rubber, encompass rubber particles passing through the finer screener, a U.S. sieve size No. 140 screen. That cut, denoted as "−140" is pneumatically conveyed, by conduit means 73 and, if present, 73' to storage bin 80.

Turning again to fiber removal, fiber is aspirationally removed from each of the three decks of products and discharged into conduit means leading to the fiber cyclone and baghouse 40.

It is emphasized that storage bins 75, 78 and 80 may be provided with bagging and weighing means (not shown) for conveyance to the purchaser or purchasers of these products.

The embodiments given above are provided to illustrate the scope and spirit of the present invention. These embodiments will make apparent, to those skilled in the art, other embodiments and examples. These other embodiments and examples are within the contemplation of the present invention. Therefore, the present invention should be limited only by the appended claims.

What is claimed is:

1. A process of making crumb and powder rubber comprising:
    (a) removing ferrous metal from a stream of granulated used rubber particles;
    (b) screening and removing fiber from said stream of granulated used rubber particles;
    (c) chilling said stream of screened granulated used rubber particles having a predetermined particle size range with a stream of a cryogenic liquid spray and a stream of a cryogenic gas flowing concurrently with said stream of said granulated used rubber particles wherein the final chilled temperature of said rubber particles is controlled with the proviso that said ferrous metal and fiber are removed from said screened granulated used rubber particles subsequent to said step (b) but prior to said step (c);
    (d) grinding said stream of chilled granulated used rubber particles by varying impact speed wherein said particle size distribution of said ground rubber particles is controlled; and
    (e) screening said ground rubber particle stream into desired crumb and/or powder rubber particle size ranges.

2. A process in accordance with claim 1 wherein said used rubber particles are particles of used vehicle tires.

3. A process in accordance with claim 2 wherein said stream of ground cryogenically cooled rubber particles are dried and fibers present in said ground rubber particle stream are removed after said step (d).

4. A process in accordance with claim 3 wherein ferrous metal and fibers in said dried stream of rubber particles are removed.

5. A process in accordance with claim 4 wherein said rubber particle stream from which ferrous metal and fiber are removed is screened to remove rubber particles whose particle size exceeds the maximum particle size of crumb rubber and wherein more fiber is removed.

6. A process in accordance with claim 5 wherein said particles from which excess sized particles are removed is screened into three rubber particle sizes within the particle size range of crumb and powder rubber.

7. A process in accordance with claim 6 wherein said rubber particles include a first particle size range of particles passing through U.S. sieve size No. 40 but not passing through U.S. sieve size No. 80; a second particle size of particles in the range of between particles passing through U.S. sieve size No. 80 but not passing through U.S. sieve size No. 140; and a third particle size of particles passing through U.S. sieve size No. 140.

8. A process in accordance with claim 1 wherein said fiber removing step (b) comprises agitating said rubber particles and aspirating lower density fiber from higher density rubber particles.

9. A process in accordance with claim 1 wherein said stream of said cryogenic gas is generated by contact of said granulated used rubber particles with said cryogenic liquid.

10. A process in accordance with claim 9 comprising controlling said of rubber particle temperature by volumetric flow rate control of said spray of said cryogenic liquid.

11. A process in accordance with claim 1 wherein said control of said particle size distribution further comprise varying the space between an impact surface and a rebound surface.

12. A process in accordance with claim 1 wherein said cryogenic liquid is liquid nitrogen and said cryogenic gas is gaseous nitrogen.

13. A process in accordance with claim 1 wherein said stream of ground cryogenically cooled rubber particles are dried to ambient temperature after said step (d).

14. A process in accordance with claim 1 wherein said granulated used rubber particles are obtained from an initial charge of used rubber particles which are subjected to the steps of:
(i) removing any tramp metal from said initial charge of used rubber particles; and
(ii) granulating said product of said step (i).

15. A process in accordance with claim 1 wherein said stream of granulated used rubber particles is provided by a charge of preprocessed used rubber particles.

16. An apparatus for making crumb and powder rubber comprising:
(a) ferrous metal removal means for removing ferrous metal from a stream of granulated used rubber particles;
(b) fiber removal means for removing fiber from said stream of granulated used rubber particles;
(c) chilling means for initially cooling said stream of granulated used rubber particles having a predetermined particle size range provided with means for introducing said stream of granulated used rubber particles, a cryogenic liquid sprqay and a cryogenic gaseous stream whereby said granulated used rubber particles are cooled to a predetermined temperature, wherein said ferrous metal removal means (a) and said fiber removal means (b) are disposed upstream of said chilling means (c);
(d) grinding means comprising means for introducing said cooled granulated used rubber particle stream between a controlled speed impact surface and an outer inverted surface wherein said cooled granulated used rubber particles are ground at said predetermined temperature to a predetermined particle sized size range; and
(e) screening means for separating said ground rubber particles into desired crumb and/or powder rubber particle size ranges.

17. An apparatus in accordance with claim 16 wherein said granulated used rubber particles are used vehicle tire particles.

18. An apparatus in accordance with claim 16 wherein said cooling means (c) comprises a cylindrical shaped vessel provided with means for controlled introduction of said cryogenic liquid and for time controlled contact of said stream of granulated used rubber particles with said cryogenic liquid.

19. An apparatus in accordance with claim 18 wherein said cryogenic liquid is liquid nitrogen, said cryogenic gas is gaseous nitrogen and said cooling means is provided with conduit means for recycle of said nitrogen gas resulting from contact of said granulated rubber particles with said liquid nitrogen whereby said vaporized nitrogen gas flows concurrently into said cooling means with said granulated rubber particle stream.

20. An apparatus in accordance with claim 18 wherein said time controlled contact is provided by a variable speed auger, disposed in said cylindrical shapped vesel, upon which said rubber particles are disposed.

21. An apparatus in accordance with claim 16 wherein said controlled speed impact surface is an impact surface provided with a plurality of replaceable knives and said outer inverted cone surface has an interior surface, in contact with said cooled granulated stream of rubber particles, comprising a serrated surface.

22. An apparatus in accordance with claim 21 wherein said outer inverted cone surface is movable in a vertical direction wherein volume between said impact surface and said serrated surface of said outer invented cone surface is increased or decreased.

23. An apparatus in accordance with claim 16 including drying means for drying said ground stream of cryogenically cooled rubber particles to ambient temperature.

24. An apparatus in accordance with claim 23 comprising a final ferrous metal and fourth fiber removal means disposed downstream of said drying means for removal of ferrous metal and fiber from said dried rubber particles.

25. An apparatus in accordance with claim 24 wherein said final ferrous metal and fourth fiber removal means, disposed downstream of said drying means, comprises a magnetic separator disposed under a vibratory pan screen wherein said ferrous metal is removed below said screen and said fibers are removed above said screen.

26. An apparatus in accordance with claim 24 comprising a fifth fiber removal means, disposed downstream of said final ferrous metal and said fourth fiber removal means, for removal of fiber from said rubber particles exiting said final ferrous metal and fiber removal means.

27. An apparatus in accordance with claim 26 wherein said fifth fiber removal means comprises a centrifugal screener wherein light fiber is removed to a fiber cyclone and baghouse.

28. An apparatus in accordance with claim 25 comprising a two-deck screening means disposed downstream of said fifth fiber removal means for removal of rubber particles having a size in excess of the size range of crumb and powder rubber.

29. An apparatus in accordance with claim 28 wherein said oversized particles are recycled to a storage bin provided with metering discharge, said storage bin being in downstream communication with said cooling means; and said particles passing through said two-deck screening means are conveyed to a three-deck screening means.

30. An apparatus in accordance with claim 17 wherein said three-deck screening means comprises a top U.S. sieve size No. 80 screen holding particles passing through a U.S. sieve size No. 40 screen, said particles held on said top screen provided with means for transfer to a U.S. sieve size No. 40 to No. 80 rubber crumb rubber particles storage bin; and a bottom U.S. sieve size No. 140 screen, said particles held on said bottom screen provided with means for transfer to a U.S. sieve size No. 80 to No. 140 storage bin; said particles passing through said bottom screen provided with means for transfer to a powder rubber storage bin holding particles finer than U.S. sieve size No. 140.

31. An apparatus in accordance with claim 30 wherein conveyance into said storage bins is effectuated by pneumatic means.

32. An apparatus in accordance with claim 23 wherein said drying means is a rotary dryer provided with a gas entraining stream to separate lower density fiber from higher density rubber particles.

33. An apparatus in accordance with claim 16 comprising:
   (i) metal detection and removal means for removing tramp metal from an initial charge of used rubber particles; and
   (ii) primary granulation means for granulating said initial charge of used rubber particles;
   wherein a stream of granulated used rubber particles is formed; and
   wherein said components (i) and (ii) are disposed upstream of said component (a).

34. An apparatus in accordance with claim 33 comprising secondary granulation means for granulation of rubber particles that do not pass through said primary screening means; and a preprocessed rubber particle hopper for holding said rubber particles exiting said primary and secondary granulation means.

35. An apparatus in accordance with claim 34 comprising a second ferrous metal and fiber removal means for removing ferrous metal and fiber from said preprocessed rubber particles exiting said preprocessed rubber particle hopper.

36. An apparatus in accordance with claim 35 comprising a third fiber removal means for removing fiber from said rubber particles exiting said second ferrous metal and fiber removal means.

37. An apparatus in accordance with claim 36 comprising a fiber cyclone and baghouse for storage of said fiber removed by each of said fiber removal means.

38. An apparatus in accordance with claim 25 comprising a storage bin with metering discharge for storage of said rubber particles exiting said third fiber removal means and from which said granulated used rubber particles are fed into said cooling means (c).

39. An apparatus for making crumb and rubber comprising:
   (a) ferrous metal removal means for removing ferrous metal from a stream of granulated used rubber particles;
   (b) fiber removal means for removing fiber from said stream of granulated used rubber particles;
   (c) an off-specfication supersack feeding hopper for introduction of used rubber particles preprocessed to screen out particles larger than sizes within the range of crumb and powder rubber and from which ferrous metal and fiber have been removed;
   (d) chilling means for cooling said stream of granulated used rubber particles having a predetermined particle size range and/or a stream of said used rubber particles introduced through said off-specification supersack feeding hopper, said chilling means provided with means for introducing said stream of granulated used rubber particulars and/or said stream of said used rubber particles introduced through said off-specification supersack feeding hopper, a cryogenic liquid spray and a cryogenic gaseous stream whereby said rubber particles of one or both of said rubber particles streams are cooled to a predetermined temperature, wherein said ferrous metal removal means (a), said fiber removal means (b) and said off-specification supersack feeding hopper (c) are disposed upstream of said cooling means (c);
   (e) grinding means for grinding said cooled rubber particles at said predetermined temperature to a predetermined particle size range; and
   (f) screening means for separating said ground rubber particles into desired crumb and/or powder rubber particle size ranges.

* * * * *